Dec. 26, 1939.  C. J. PATTERSON  2,185,062
TANDEM AXLE FOR TRUCKS
Filed Dec. 1, 1938  2 Sheets-Sheet 1
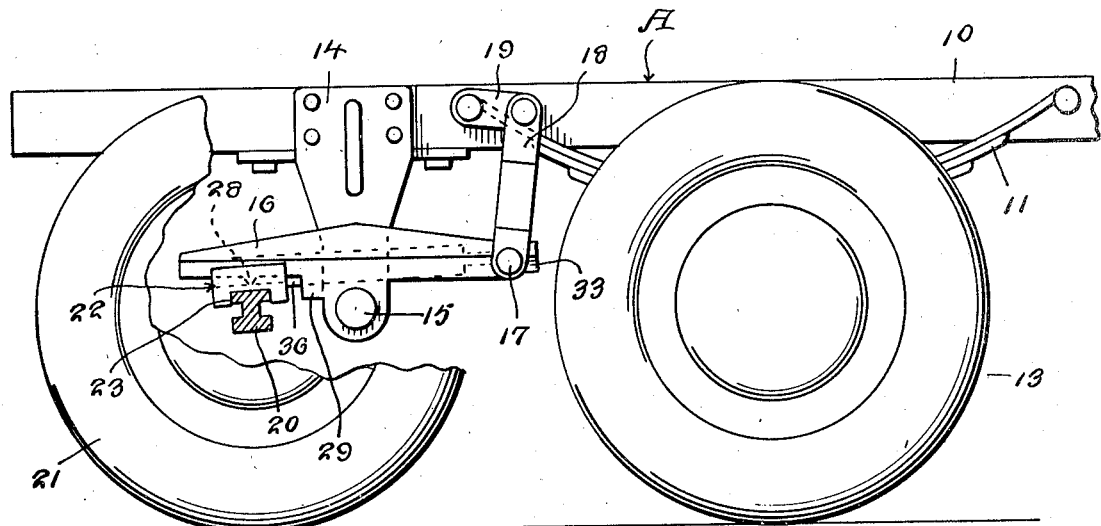
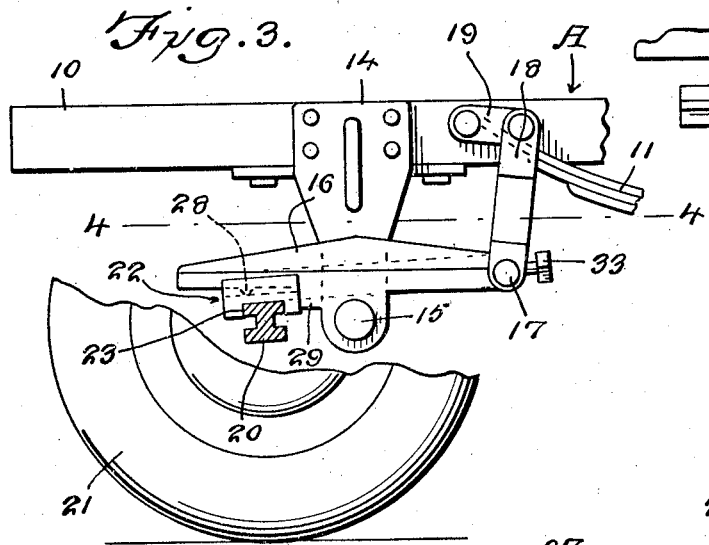
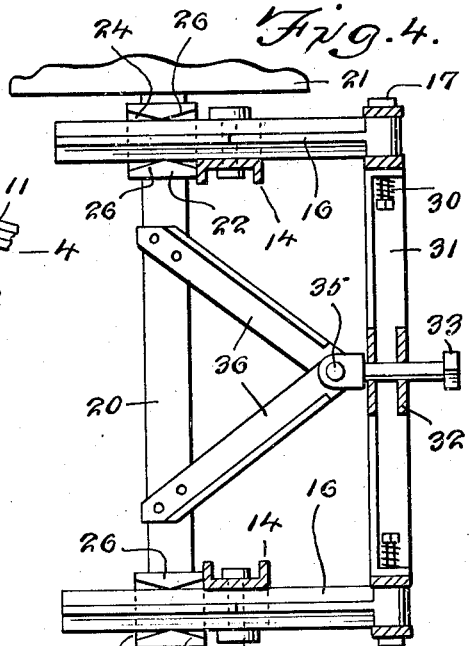
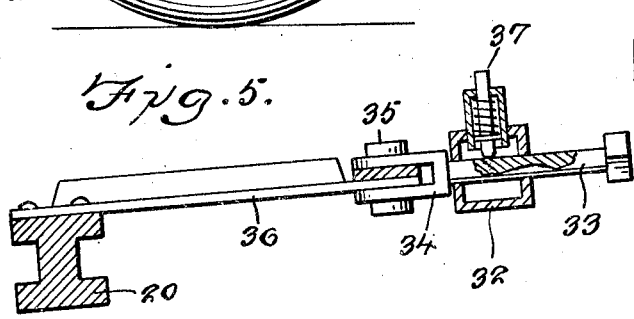
C. J. Patterson
INVENTOR
BY Victor J. Evans & Co.
ATTORNEY Dec. 26, 1939.   C. J. PATTERSON   2,185,062
TANDEM AXLE FOR TRUCKS
Filed Dec. 1, 1938   2 Sheets-Sheet 2
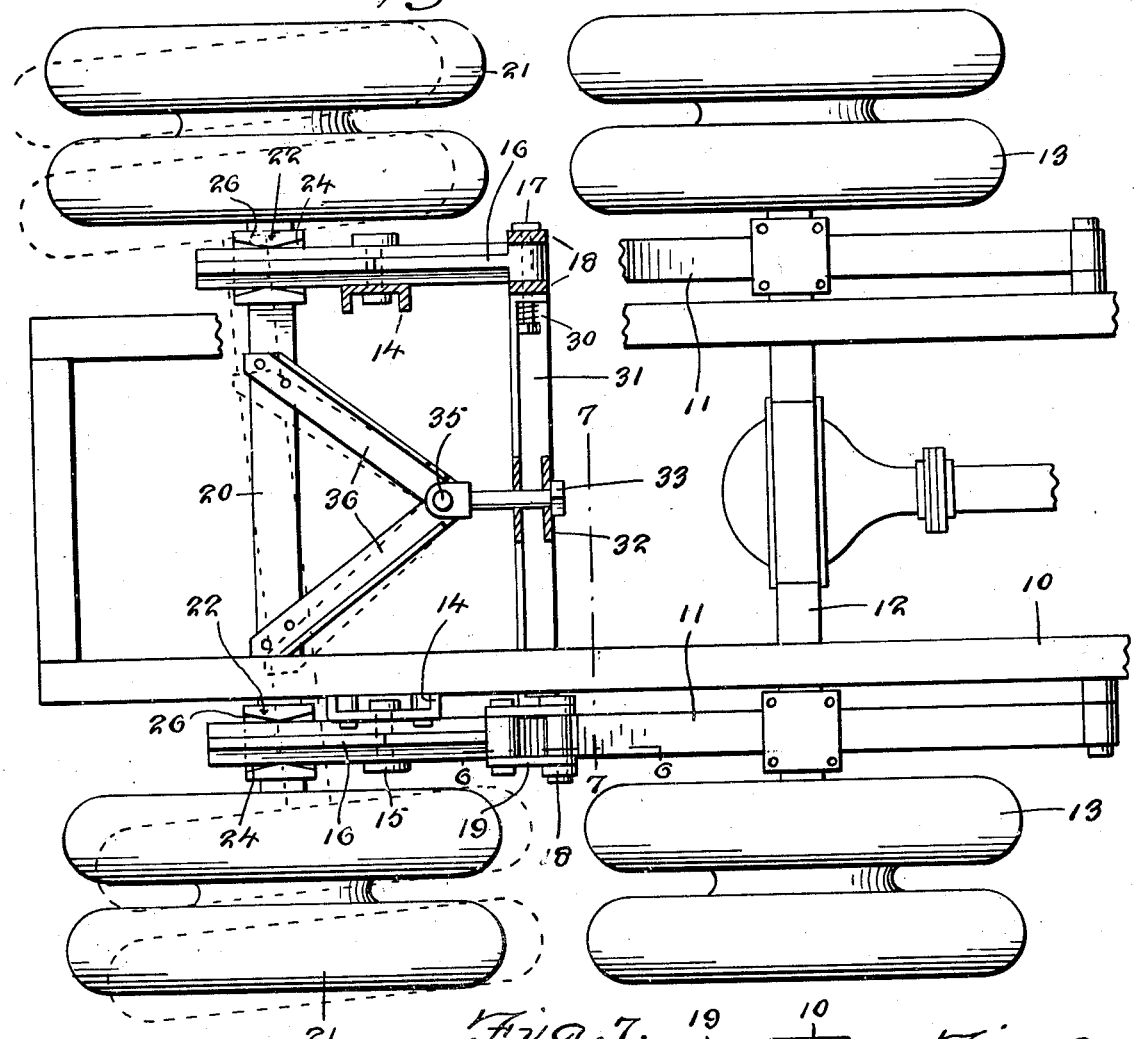
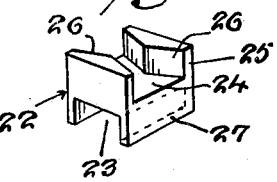
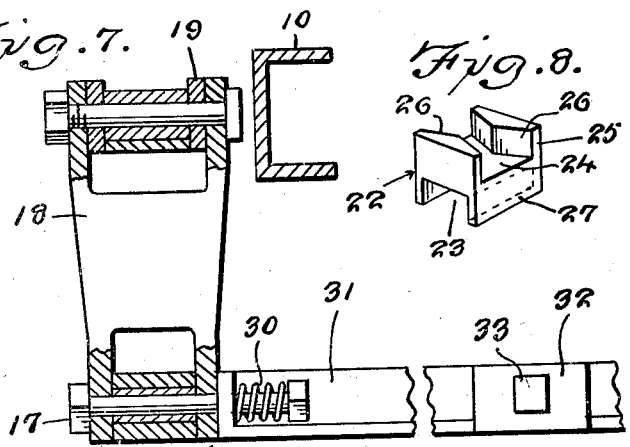
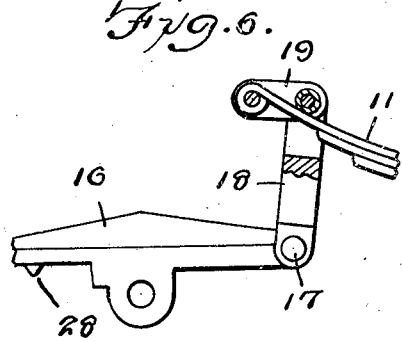
C. J. Patterson INVENTOR
BY Victor J. Evans & Co.
ATTORNEY Patented Dec. 26, 1939

2,185,062

UNITED STATES PATENT OFFICE 2,185,062

TANDEM AXLE FOR TRUCKS

Chester J. Patterson, Lancaster, Pa.

Application December 1, 1938, Serial No. 243,430

4 Claims. (Cl. 280—124)

The invention relates to a tandem axle for motor vehicles, such as trucks or the like, and more especially to a floating tandem axle.

The primary object of the invention is the provision of an axle of this character, wherein the wheels journaled thereon will constantly track the rear driving wheels of a motor such as a truck or the like and will not drag when such vehicle is making a curve or irregularity from the straight course under advancement thereover.

Another object of the invention is the provision of an axle of this character, wherein through the use of certain controls the wheels journaled on said axle will be caused to travel in a straight aligned relation to the driving wheels of the vehicle when the latter is backing so that straight backing of the vehicle can be assured.

A further object of the invention is the provision of an axle of this character, wherein the mounting thereof with relation to the chassis of a motor vehicle is novel in its entirety so that floating of such axle is constantly had for the proper tracking of the wheels journaled thereon with relation to the driving wheels of the vehicle and without liability of side skidding or drag to the wheels journaled upon said tandem axle.

A still further object of the invention is the provision of an axle of this character, which is simple in its construction, unique in the make-up with adjunct parts in association therewith, strong, durable, thoroughly reliable and efficient in operation, being automatic in the tracking activity and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a fragmentary side elevation of the chassis of a motor vehicle, being partly in section, and showing the tandem axle constructed in accordance with the invention in association therewith.

Figure 2 is a fragmentary top plan view, partly in section.

Figure 3 is a view similar to Figure 1 showing the tandem axle in a shifted position for straight backing of the vehicle.

Figure 4 is a sectional view taken on the line 4—4 of Figure 3.

Figure 5 is a fragmentary vertical longitudinal sectional view thereof and on an enlarged scale.

Figure 6 is a fragmentary sectional view taken on the line 6—6 of Figure 2.

Figure 7 is an enlarged fragmentary sectional view taken on the line 7—7 of Figure 2.

Figure 8 is a perspective view of a floating guide block or bearing for the axle.

Similar reference characters indicate corresponding parts throughout the several views in the drawings.

Referring to the drawings in detail, A designates generally a portion of the chassis of a motor vehicle of the truck type and involves a chassis frame 10 with which is associated at each side thereof a multiple ply bowed spring 11 to which the rear driving axle housing 12 is connected, the driving wheels for the said axle being indicated at 13 and are of the duplex type. These parts of the motor vehicle are of conventional construction and setup, being merely illustrated for a disclosure of the adaptation of the tandem axle constructed in accordance with the invention.

Rearwardly of the axle housing 12 at opposite sides of the chassis frame 10 and fixed to the side beams thereof are depending hangers 14, these being in transverse alignment with each other and carry stud pivots 15 for rocker arms 16 which extend fore and aft with relation to said hangers, the stud pivots 15 being centered relative to the longitudinal extent of said arms. Each arm at the forward end has pivotal connection at 17 by linkage 18 with the companion shackle 19 for the spring 11 next thereto and such arm 16 is caused to rock under load and traveling conditions of the motor vehicle through activity of the springs 11 of such vehicle.

Located beneath the rear ends of the rocking arms 16 and rearmost with respect to the hangers 14 is a floating tandem axle 20 having journaled thereon wheels 21, these of the duplex type, and this axle 20 in its functioning assures tracking of the said wheels 21 relative to the driving wheels 13 of the vehicle. Interposed between the rocking arms 16 and the said axle 20 are floating bearings in the form of blocks 22, each at its lowermost face having a guide recess 23 for the slidable interfitting of the block 22 and the axle 20. The upper side of each block 22 is countersunk to provide a guide recess or way 24 for the rocking arm 16 companion thereto, the side wall 25 for the recess or way 24 being reversely beveled at 26 so that clearance is assured with respect to the swing of the axle 20 when the wheels 21 are tracking the wheels 13 of the vehicle during advancement thereof and following a curve or irregularity in its course. The recess 23 in each block 22 at opposite sides thereof is walled at 27 so that there is no chance of displacement of the block 22 in a transverse direction to the longitudinal extent of the axle 20 during relative movement of such blocks 22 and the said axle 20, particularly when the vehicle is making a curve in its advance course.

It is preferable to have each rocking arm 16 provided with a fulcrum protuberance 28 for contact with its companion block 22 and the functioning of such protuberance is to initiate the approach of the said blocks 22 in the direction of the hangers 14 when the vehicle is backing so that these blocks will move into contact with abutments or stops 29 formed with the rocking arms 16 and thereby assuring a parallel relation of the driving axle housing 12 and the axle 20 with the result that the wheels 21 will be aligned and straight tracked with the wheels 13 of the vehicle during the backing period so that such backing can follow a straight course.

The interfitting of the axle 20 with the blocks 22 is such as to avoid loose play therebetween and this is also true with respect to the interfitting of the rocking arms 16 with the said blocks 22 as is clearly illustrated in Figures 1 to 4 of the drawings.

Intermediate with relation to the housing 12 and the axle 20 and horizontally pivoted through anti-rattling pivots 30 with the linkage 18 is a cross angle bar 31 which medially thereof is built with a guide eye housing 32 for accommodating the slidable stem or shank 33 therein of a draw bar 34 pivotally coupled at 35 with rearwardly divergent draw arms 36, these being fixedly fitted in their rearward divergent relation medially of the axle 20. The guide eye housing 32 has built therewith a spring tensioned anti-rattling device 37 which coacts with the stem or shank 33 so as to relieve undue play of the latter in the housing 32, being in frictional engagement and allows longitudinal displacement of the draw bar for the automatic swing of the axle 20 when the motor vehicle is making a turn in its course on advancement thereof so that the wheels 21 journaled on said axle 20 will positively track the driving wheels 13 of the vehicle and also to permit of the approach of the said axle 20 together with the blocks 22 toward the abutments 29 when the vehicle is backing so that the axle 20 will assume a position to have the wheels 21 journaled thereon straightened and tracked with the wheels 13 in a straight backing course of such vehicle.

By reason of the construction and the assembly hereinbefore set forth, there is assured a positive drag tracking of the wheels 21 with the wheels 13 of the vehicle in a straight forward or rearward course or when the vehicle is making a turn, this being true with respect to advancement or backing of such vehicle.

What is claimed is:

1. A tandem axle for a motor vehicle having a chassis frame provided with a rear axle carrying traction wheels, comprising a floating axle having trailer wheels, means loosely connecting the floating axle with the chassis frame, rocking elements supported by said chassis frame, bearings interposed and slidably fitted with the floating axle and the rocking elements, linkage between the rocking elements and the said chassis frame, and abutments on the rocking elements in the path of movement of the bearings interposed with said elements for limiting the movement of the bearings in one direction whereby on the backing of the vehicle the traction and trailer wheels automatically align and track with each other in a straight course.

2. A tandem axle for a motor vehicle having a chassis frame provided with a rear axle carrying traction wheels, comprising a floating axle having trailer wheels, means loosely connecting the floating axle with the chassis frame, rocking elements supported by said chassis frame, bearings interposed and slidably fitted with the floating axle and the rocking elements, linkage between the rocking elements and the said chassis frame, abutments on the rocking elements in the path of movement of the bearings interposed with said elements for limiting the movement of the bearings in one direction whereby on the backing of the vehicle the traction and trailer wheels automatically align and track with each other in a straight course, and fulcrums on the rocking elements and engageable with the bearings.

3. A tandem axle for a motor vehicle having a chassis frame provided with a rear axle carrying traction wheels, comprising a floating axle having trailer wheels, means loosely connecting the floating axle with the chassis frame, rocking elements supported by said chassis frame, bearings interposed and slidably fitted with the floating-axle and the rocking elements, linkage between the rocking elements and the said chassis frame, abutments on the rocking elements in the path of movement of the bearings interposed with said elements for limiting the movement of the bearings in one direction whereby on the backing of the vehicle the traction and trailer wheels automatically align and track with each other in a straight course, fulcrums on the rocking elements and engageable with the bearings, and means frictionally engageable with the connection between the floating axle and the chassis frame.

4. A tandem axle for a motor vehicle having a chassis frame provided with a rear axle carrying traction wheels, comprising a floating axle having trailer wheels, means loosely connecting the floating axle with the chassis frame, rocking elements supported by said chassis frame, bearings interposed and slidably fitted with the floating axle and the rocking element, linkage between the rocking elements and the said chassis frame, abutments on the rocking elements in the path of movement of the bearings interposed with said elements for limiting the movement of the bearings in one direction whereby on the backing of the vehicle the traction and trailer wheels automatically align and track with each other in a straight course, fulcrums on the rocking elements and engageable with the bearings, means frictionally engageable with the connection between the floating axle and the chassis frame, and a draw bar included in said connections with the floating axle and the chassis frame and centered transversely of the vehicle.

CHESTER J. PATTERSON.